(12) United States Patent
Yeh

(10) Patent No.: US 9,190,912 B2
(45) Date of Patent: Nov. 17, 2015

(54) POWER CONTROL CIRCUIT DETECTING A PHASE OF A BURST INITIALIZING SIGNAL AND POWER CONTROLLING METHOD DETECTING A PHASE OF A BURST INITIALIZING SIGNAL

(75) Inventor: Wen-Chung Yeh, Hsin-Chu (TW)

(73) Assignee: Leadtrend Technology Corp., Science-Based Industrial Park, Hsin-Chu (TW)

( * ) Notice: Subject to any disclaimer, the term of this patent is extended or adjusted under 35 U.S.C. 154(b) by 837 days.

(21) Appl. No.: 13/330,652

(22) Filed: Dec. 19, 2011

(65) Prior Publication Data
US 2012/0161727 A1 Jun. 28, 2012

(30) Foreign Application Priority Data
Dec. 28, 2010 (TW) .............................. 99126242 A

(51) Int. Cl.
*H02M 3/335* (2006.01)
*H02M 1/00* (2007.01)
(52) U.S. Cl.
CPC .. *H02M 3/33507* (2013.01); *H02M 2001/0035* (2013.01)
(58) Field of Classification Search
CPC .............................................. H02M 2001/0035

USPC ......... 323/222, 223, 224, 237, 241, 246, 282, 323/283, 284, 285
See application file for complete search history.

(56) References Cited

U.S. PATENT DOCUMENTS

| 5,477,257 A * | 12/1995 | Murata .......................... 347/135 |
| 5,812,383 A * | 9/1998 | Majid et al. ................. 363/21.05 |
| 7,034,513 B2 * | 4/2006 | Gan et al. ....................... 323/285 |
| 7,492,619 B2 * | 2/2009 | Ye et al. ........................... 363/97 |
| 2008/0231208 A1 * | 9/2008 | Kimura .......................... 315/277 |
| 2009/0219000 A1 | 9/2009 | Yang |

FOREIGN PATENT DOCUMENTS

TW 200939604 9/2009

* cited by examiner

*Primary Examiner* — Harry Behm
(74) *Attorney, Agent, or Firm* — Winston Hsu; Scott Margo

(57) ABSTRACT

In a switching mode power supply, a power controlling circuit includes a phase generator and a phase controller. The phase generator provides a clock signal. The phase controller detects phases of a phase reference signal and a burst initialization signal so as to generate a burst signal, and causes a phase of the burst signal to not be earlier than the phase of the group reference signal. The burst signal is utilized for switching the power supply between a non-switching state and a switching state. The group reference signal is generated according to the clock signal and has a lower frequency than the clock signal. The burst initialization signal is controlled by an output voltage source of the power supply.

9 Claims, 13 Drawing Sheets

POWER CONTROL CIRCUIT DETECTING A PHASE OF A BURST INITIALIZING SIGNAL AND POWER CONTROLLING METHOD DETECTING A PHASE OF A BURST INITIALIZING SIGNAL

BACKGROUND OF THE INVENTION

1. Field of the Invention

The present invention discloses a power supply and a power controlling method thereof, and more particularly, to a power controller operated with light-load or no load and a power controlling method thereof.

2. Description of the Prior Art

A power supply is utilized for transforming power so as to provide specification-qualified power to electronic devices or elements. Lower power consumption in the power supply is advantageous when considering transformation efficiency. More particularly, when the power supply is under light-load or no-load, tiny increases in power consumption significantly reduce the transformation efficiency of the power supply. Therefore, reducing power consumption of the power supply under light-load or no load conditions is an important goal for designers.

Under light-load or no load conditions, a switched mode power supply is designed to enter a skip mode or a burst mode. Taking flyback power supply 60 shown in FIG. 1 as an example, power management controller 74 is configured to control power switch 72 so as to cause transformer 65 to be energized by input voltage source AC or to de-energize to an output voltage $V_{OUT}$. Compensation signal $S_{COM}$ is controlled by the output voltage $V_{OUT}$ via a feedback path formed by inductor LT431 and photo coupler 63. FIG. 2 illustrates inner circuitry of power management controller 74a which can replace power management controller 74 shown in FIG. 1. When burst signal $S_{BST}$ is asserted, indicating a switching state of power supply 60, clock signal $S_{CLK}$ generated by clock generator 86 is utilized for periodically switching on power switch 72 via logic controller 62. The ON time of power switch 72 is controlled by constraint signal $S_{CS-L}$ and comparator 82. Constraint signal $S_{CS-L}$ is generated by level shifter 67 and can be regarded as being equivalent to compensation signal $S_{COM}$. Resistor 61 provides a power path, which supplies with power from voltage source $V_{CC}$ so as to generate compensation signal $S_{COM}$. When compensation signal $S_{COM}$ is lower than burst reference signal $V_{BST-REF}$, comparator 84 disasserts burst signal $S_{BST}$ so that power switch 72 cannot be activated by clock signal $S_{CLK}$ and power supply 60 is kept in a non-switching state. FIG. 3 illustrates waveforms of clock signal $S_{CLK}$, signal $V_G$, and current detection signal $V_{CS}$ shown in FIG. 2 when power management controller 74a is under light-load or no-load. In response to the variation of compensation signal SCOM, power management controller 74a controls signal $V_G$ to switch on and off power switch 72 for one or a plurality of consecutive switch periods, and to constantly turn off power switch 72 for another or a plurality of successive, consecutive switch periods; this indicates a skip mode or a burst mode, and is unified as the burst mode in the following descriptions.

Conceptually, the burst mode is utilized for skipping a plurality of roughly-invalid, consecutive switch periods but focusing power transformation on a plurality of valid consecutive switch periods. However, if the power transformation is not appropriately controlled during the valid consecutive switch periods, audio noises may occur under the burst mode. For example, if group frequency $f_G$ corresponding to group period $T_G$, which, as shown in FIG. 3, is the sum of time $T_B$ of staying in the switching state and time $T_S$ of staying in the non-switching state, falls within an audible frequency range, annoying audio noise is likely to occur.

These and other objectives of the present invention will no doubt become obvious to those of ordinary skill in the art after reading the following detailed description of the preferred embodiment that is illustrated in the various figures and drawings.

DETAILED DESCRIPTION

Flyback switching mode power supplies are utilized in embodiments described in the specification, though other types of power supplies, such as boost power supplies and buck power supplies, or other power supplies may also be utilized in embodiments of the present invention.

Figure 1:
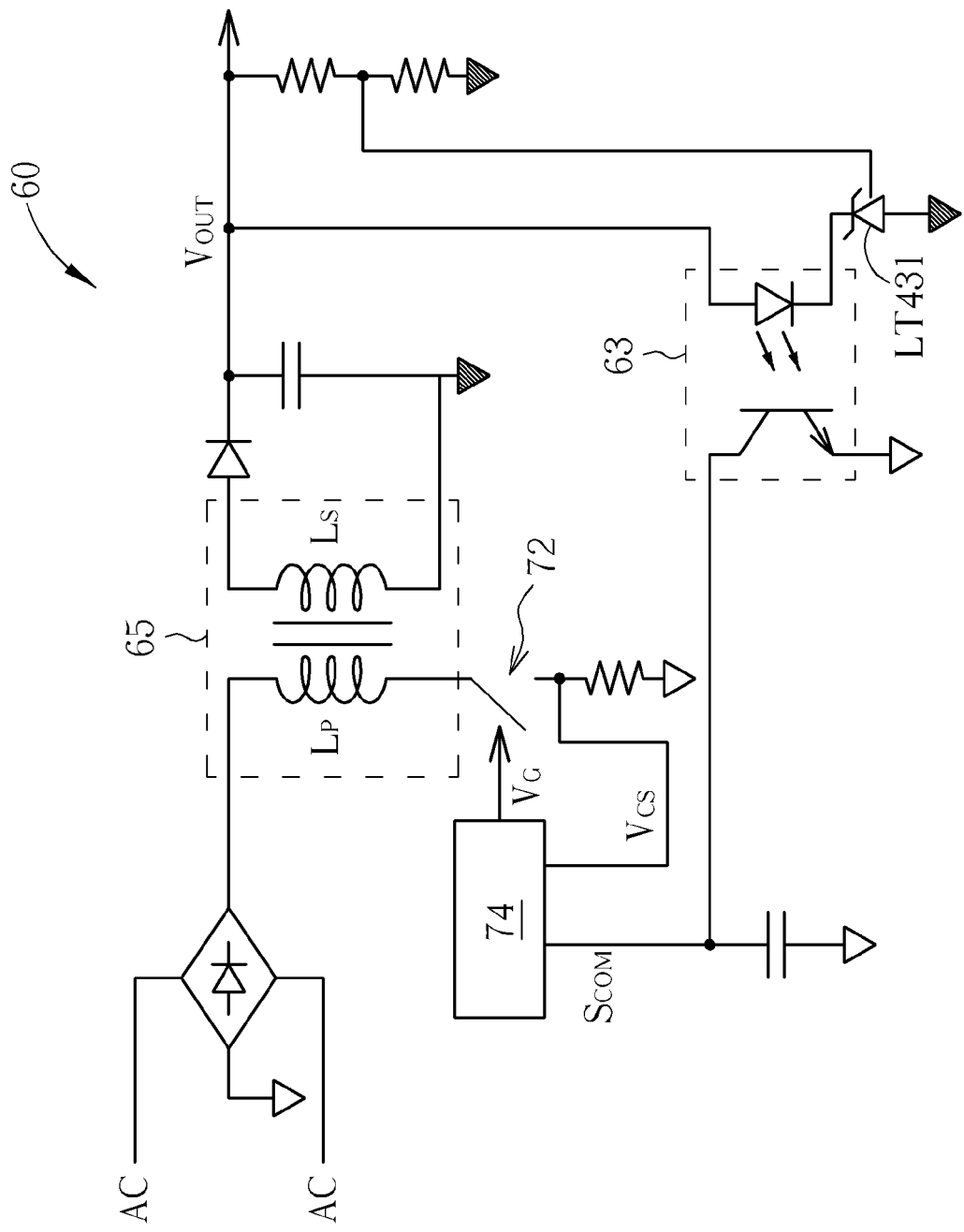
FIG. 1 illustrates a flyback power supply.
Figure 4:
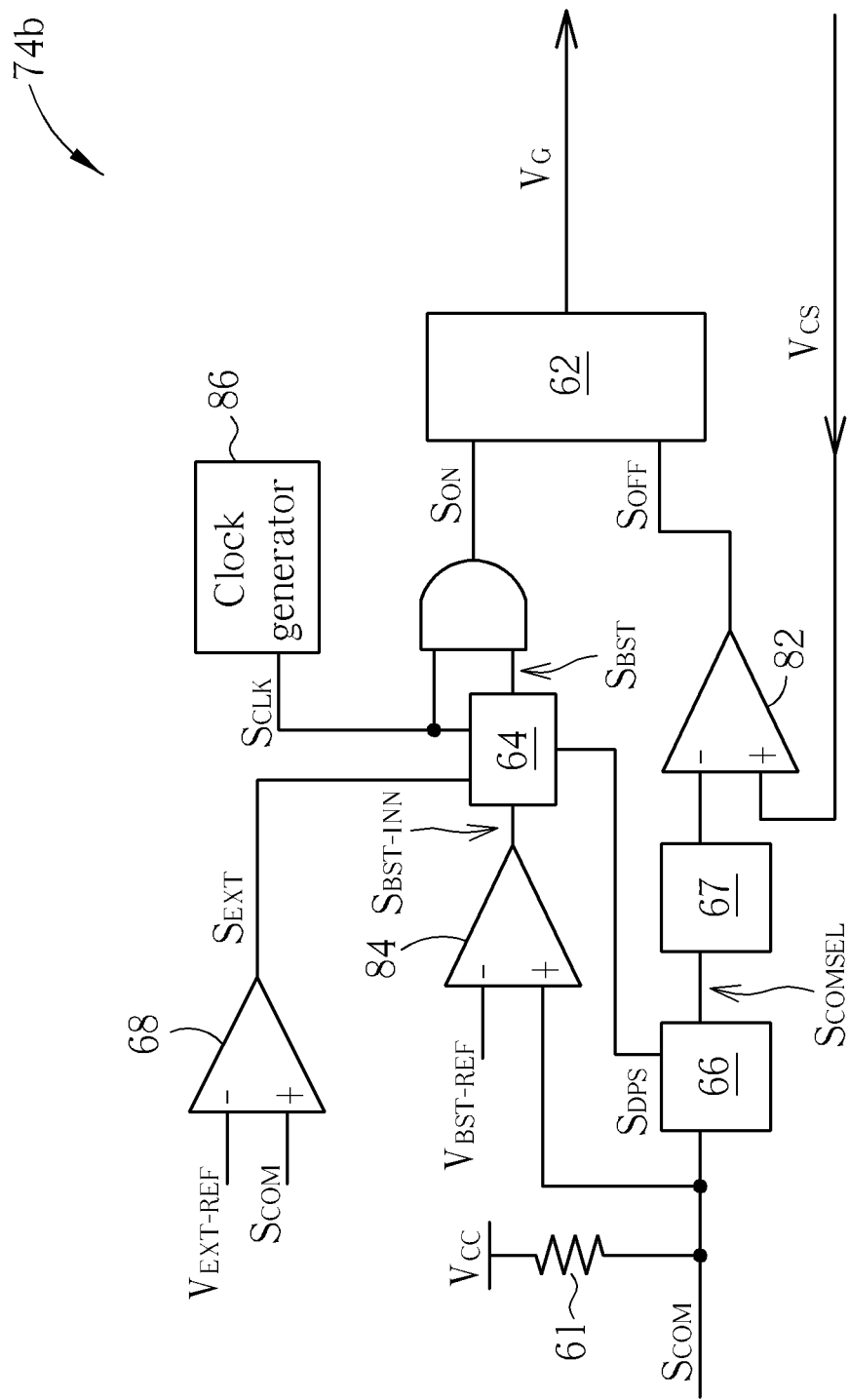
FIG. 4 illustrates a power management controller according to one embodiment of the present invention.

FIG. 4 illustrates power management controller 74b which, in one embodiment, might be utilized for replacing power supply 60 shown in FIG. 1. Power management controller 74b is capable of depressing group frequency $f_G$ to be lower than a specific frequency. For example, group frequency $f_G$ may not be higher than 1 kHz. Therefore, magnitudes of harmonic frequencies of group frequency $f_G$ can be very low within an audio sensitive range, which may range between 5 kHz and 15 kHz, so as to reduce occurrence of audio noise.

Figure 2:
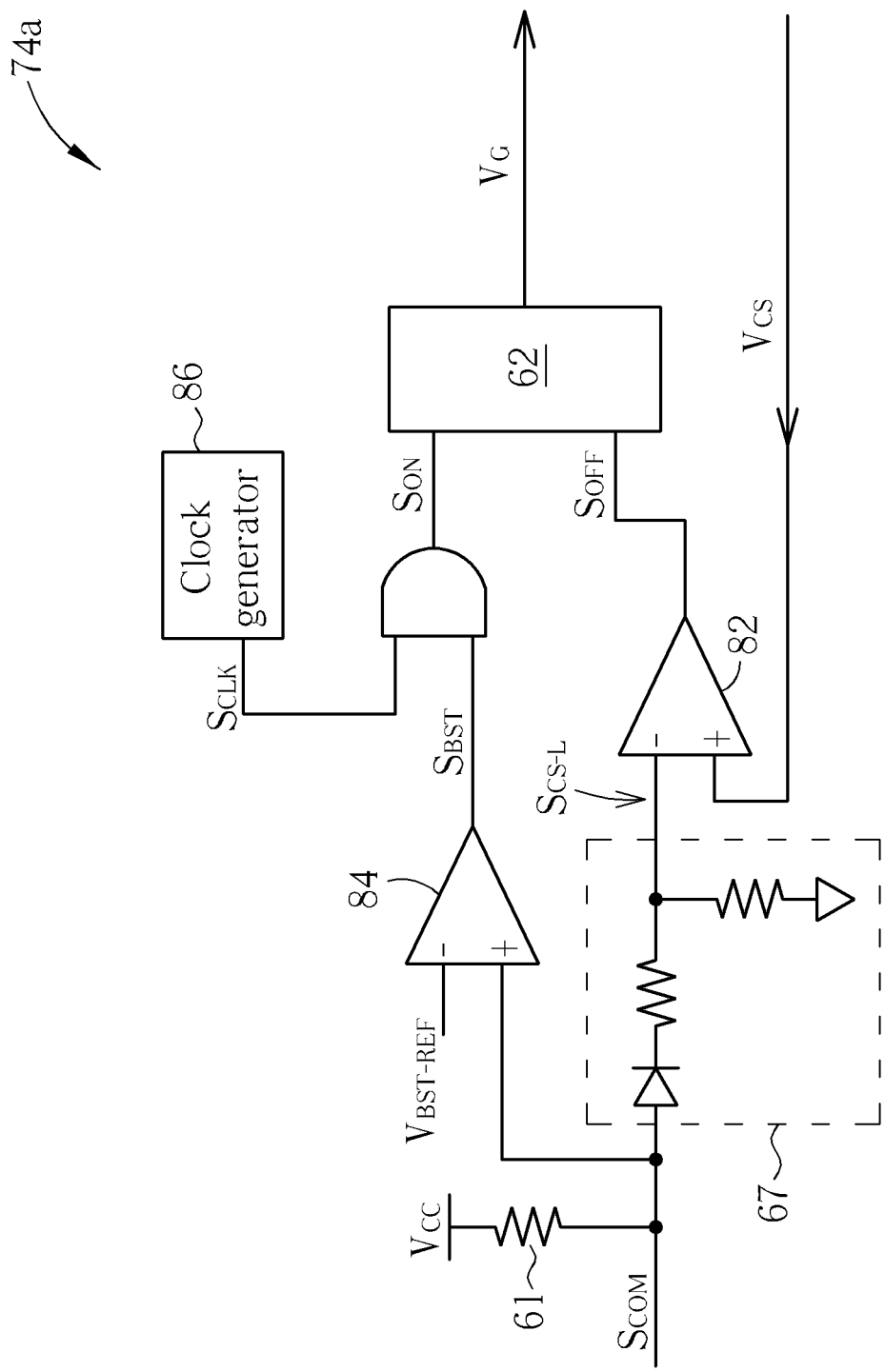
FIG. 2 illustrates inner circuitry of a power management controller.
Figure 3:
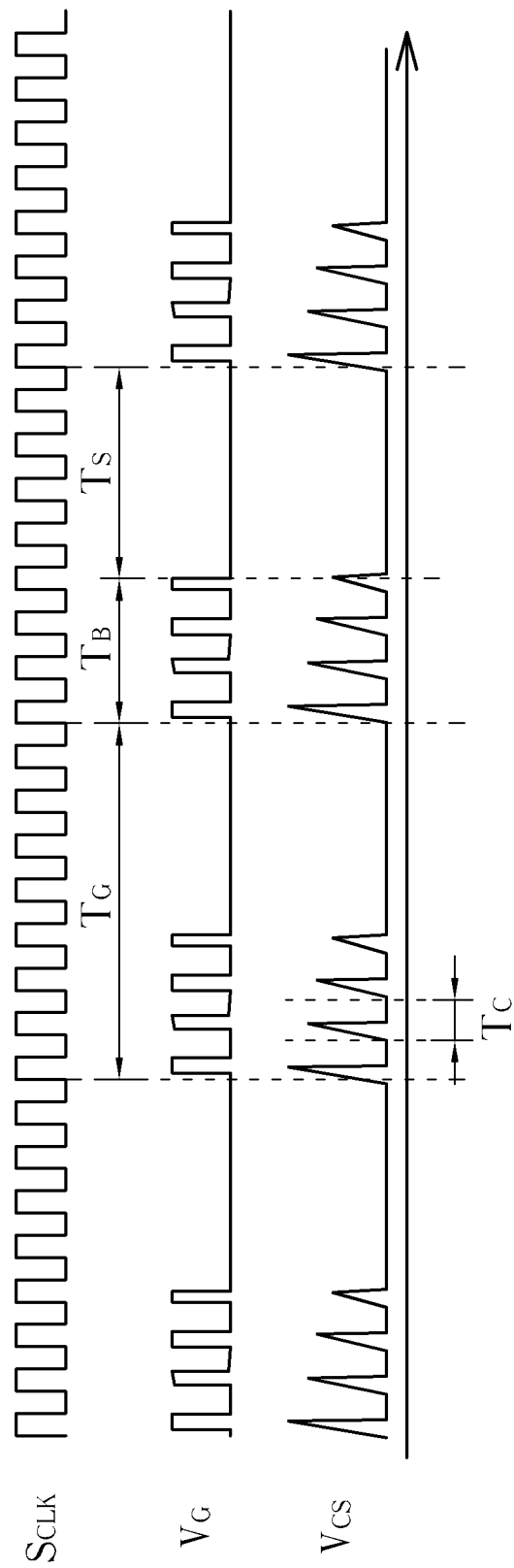
FIG. 3 illustrates waveforms of clock signal $S_{CLK}$, signal $V_G$, and current detection signal $V_{CS}$ shown in FIG. 2.

In comparison with FIG. 2, phase controller 64, peak fixer 66, and exit comparator 68 are added in FIG. 4. Other elements are known by people skilled in the related art and are therefore not described herein.

Phase controller 64 has three input terminals for respectively receiving clock signal $S_{CLK}$ generated from clock generator 86, burst initialization signal $S_{BST-INN}$ generated from comparator 84, and exit signal $S_{EXT}$ provided by exit comparator 68, and generates burst signal $S_{BST}$ and depressing signal $S_{DPS}$. When burst initialization signal $S_{BST-INN}$ toggles, though power supply 60 should switch the switching state or the non-switching state, phase controller 64 does not necessarily toggle burst signal $S_{BST}$ immediately; instead, phase controller 64 performs the transition of burst signal $S_{BST}$ in response to the phases of occurrences of burst initialization signal $S_{BST-INN}$ and group reference signal $S_{SCLK}$. Additionally, under certain circumstances, phase controller 64 is capable of asserting depression signal $S_{DPS}$ to roughly fix peaks of current detection signal $V_{CS}$ at a constant value via peak fixer 66, so that peaks of current detection signal $V_{CS}$ will not vary in response to compensation signal $S_{COM}$. Operations of phase controller 64 and peak fixer 66 will be described in the following embodiments of circuits.

Figure 5:
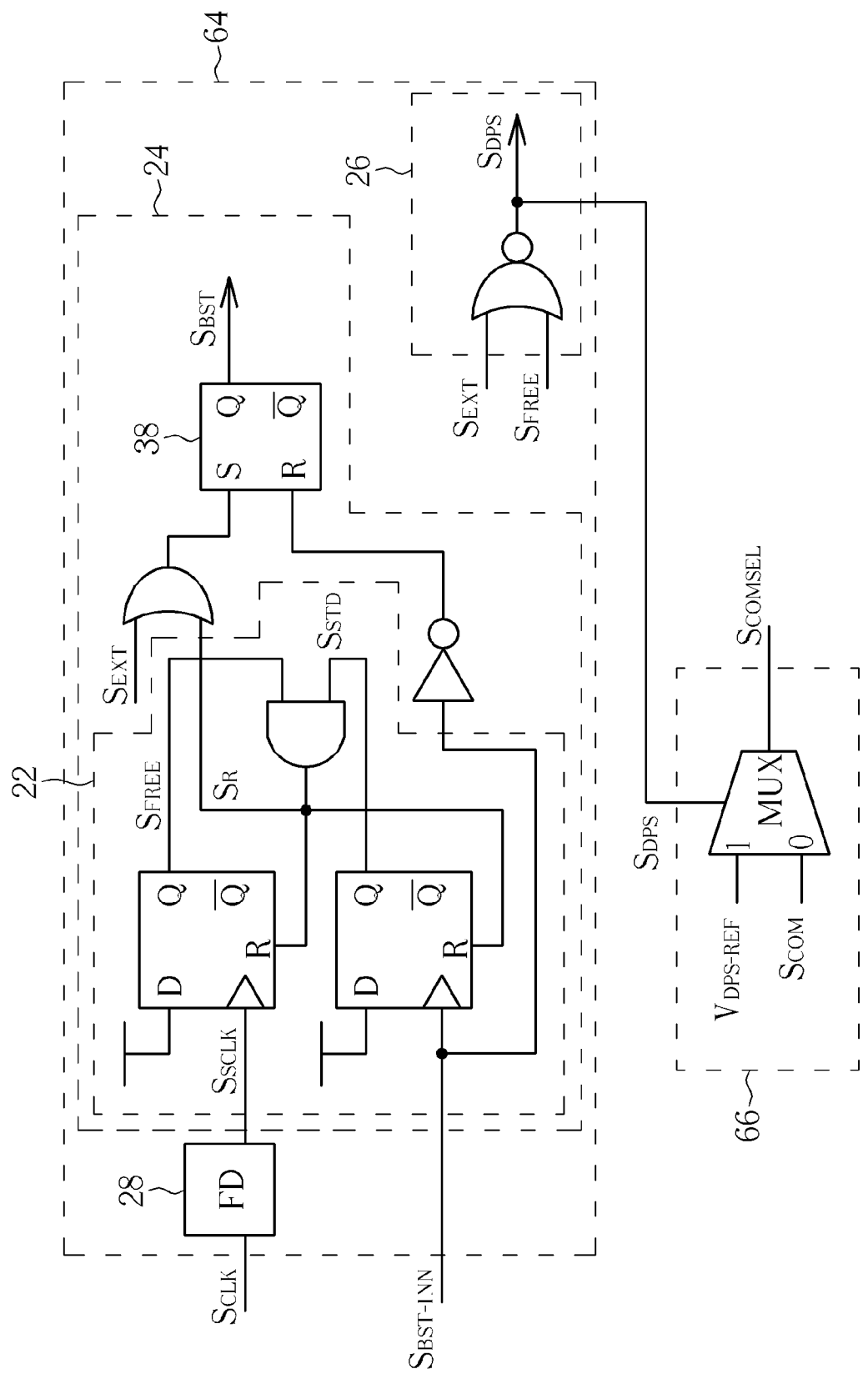
FIG. 5 illustrates inner circuitry of a phase controller and a peak fixer shown in FIG. 4.

FIG. 5 illustrates phase controller 64 and peak fixer 66 in detail.

Phase controller 64 includes down converter 28, depression signal generator 26, and frequency limiter 24. Down converter 28 generates a low-frequency group reference signal $S_{SCLK}$ according to clock signal $S_{CLK}$. For example, when a frequency of clock signal $S_{CLK}$ is 25 kHz, the frequency of group reference signal $S_{SCLK}$ may be 1 kHz. Depression signal generator 26 disasserts depression signal $S_{DPS}$ when free signal $S_{FREE}$ or exit signal $S_{EXT}$ is asserted.

Frequency limiter 24 prevents the frequency of burst signal $S_{BST}$ from being higher than the frequency of group reference signal $S_{SCLK}$. Frequency limiter 24 includes phase comparator 22 which is configured to compare the phase of group reference signal $S_{SCLK}$ with the phase of burst initialization signal $S_{BST-INN}$. In FIG. 5, phase comparator 22 compares occurrence of a rising edge of group reference signal $S_{SCLK}$ and occurrence of a rising edge of burst initialization signal $S_{BST-INN}$. If the occurrence of the rising edge of burst initialization signal $S_{BST-INN}$ is earlier than the occurrence of a rising edge of group reference signal $S_{SCLK}$, waiting signal $S_{STD}$ is asserted; otherwise, free signal $S_{FREE}$ is asserted.

Figure 6:
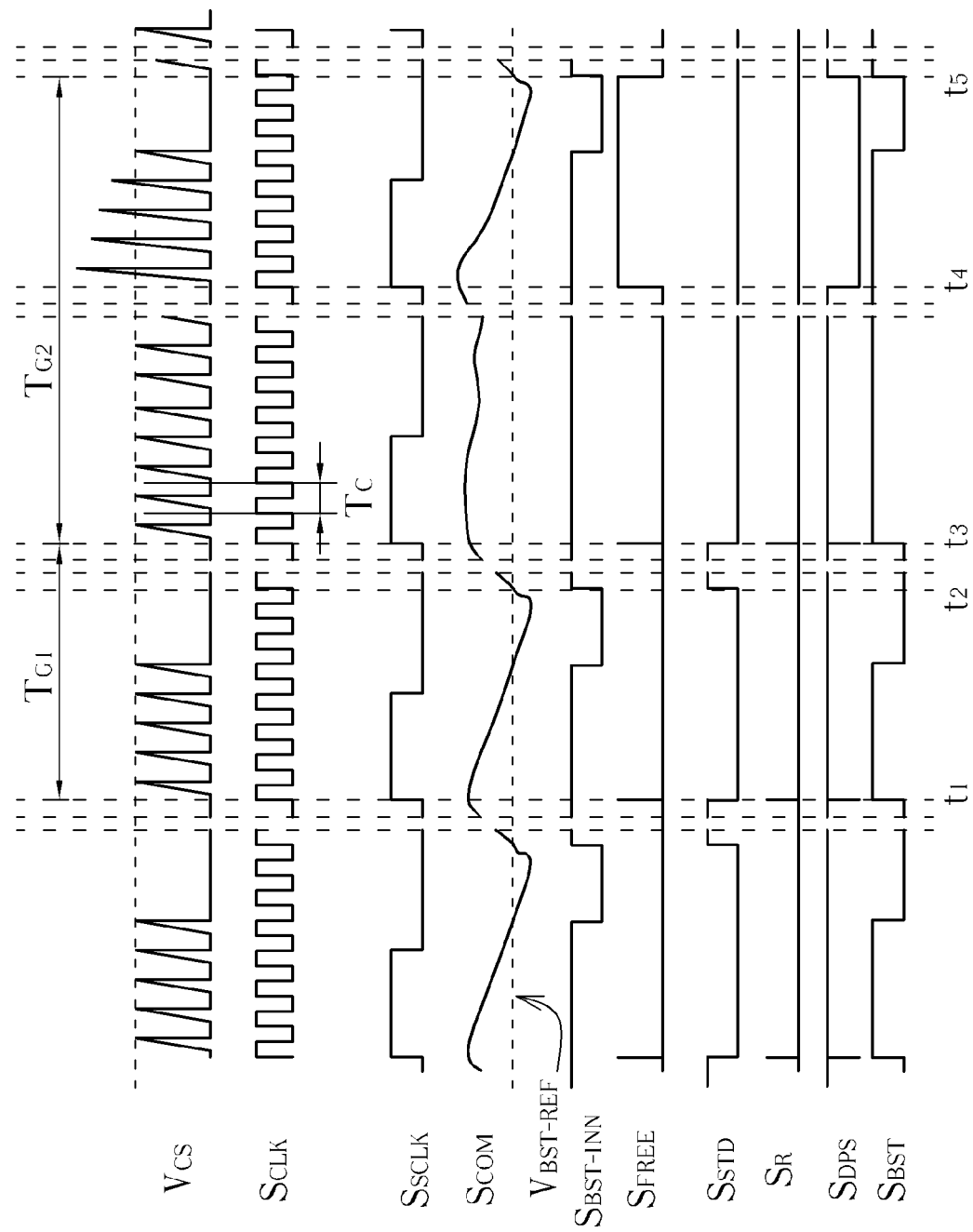
FIG. 6 illustrates waveforms of the power management controller shown in FIG. 4 under variations of loadings.

FIG. 6 illustrates waveforms of power management controller 74b shown in FIG. 4 under variation of a load to explain the operations of phase controller 64 and peak fixer 66 shown in FIG. 5. From top to bottom, waveforms shown in FIG. 6 represent current detection signal $V_{CS}$, clock signal $S_{CLK}$, group reference signal $S_{SCLK}$, compensation signal $S_{COM}$, burst initialization signal $S_{BST-INN}$ free signal $S_{FREE}$ waiting signal $S_{STD}$ reset signal $S_R$, depression signal $S_{DPS}$, and burst signal $S_{BST}$. People skilled in the related art are able to roughly derive other waveforms by referencing the assumed waveform of compensation signal $S_{COM}$ shown in FIG. 6 and the circuitry shown in FIG. 1, FIG. 4, and FIG. 5.

As observed in group period $T_{G1}$ ranging from moment $t_1$ to moment $t_3$, though at moment $t_2$ compensation signal $S_{COM}$ is raised to be higher than burst reference voltage $V_{BST-REF}$ a rising edge of burst signal $S_{BST}$ does not occur and power supply 60 remains in the non-switching state until the rising edge of group reference signal $S_{SCLK}$ occurs at moment $t_3$. In the meantime, the current group frequency indicated by the reciprocal of group period $T_{G1}$ is equal to a frequency of group reference signal $S_{SCLK}$.

Please reference to the group period $T_{G2}$ ranging from moment $t_3$ to moment $t_5$. Since the rising edge of free signal $S_{FREE}$ has occurred at moment $t_4$, the rising edge of burst signal $S_{BST}$ occurs right after compensation signal $S_{COM}$ is raised to be higher than burst reference voltage $V_{BST-REF}$ at moment $t_5$. In the meantime, the current group frequency indicated by the reciprocal of group period $T_{G2}$ is lower than the frequency of group reference signal $S_{SCLK}$.

Therefore, as can be observed from group periods $T_{G1}$ and $T_{G2}$, occurrence of the rising edge of burst signal $S_{BST}$ cannot be earlier than occurrence of the rising edge of group reference signal $S_{SCLK}$ and the group frequency corresponding to the burst signal $S_{BST}$ is not higher than the group frequency corresponding to the group reference signal $S_{SCLK}$.

It can also be observed that even though the power supply 60 enters the switching state at moments $t_1$ and $t_3$, the peak of current detection signal $V_{CS}$ is constant without following the compensation signal $S_{COM}$ for several successive switch periods. This is because that each time when burst signal $S_{BST}$ is asserted, the reset signal $S_R$ must be asserted, free signal $S_{FREE}$ and depression signal $S_{DPS}$ are accordingly disasserted, and, as a result, input signal $S_{COMSEL}$ for level shifter 67 is fixed as reference voltage $V_{DPS-REF}$. At moment $t_4$, free signal $S_{FREE}$ is asserted, so that peak fixer 66 causes input signal $S_{COMSEL}$ to follow compensation signal $S_{COM}$, and the peak of current detection signal $V_{CS}$ to vary in correspondence with compensation signal $S_{COM}$. Accordingly, peak fixer 66 is deemed to substantially keep the outputted power of power supply 60 constant for several clock periods after power supply 60 is switched from the non-switching state to the switching state.

As can be observed from FIG. 4, when compensation signal $S_{COM}$ is higher than exit reference voltage $V_{EXT-REF}$, indicating that high power is urgently required by the current load, power supply 60 should immediately enter the switching state. For example, burst reference voltage $V_{BST-REF}$ may be 2 Volts, and exit reference voltage $V_{EXT-REF}$ may be 3 Volts. As can be observed in FIG. 5, when exit signal $S_{EXT}$ is asserted, burst signal $S_{BST}$ will be asserted immediately, and peak fixer 66 also immediately causes input signal $S_{COMSEL}$ to follow compensation signal $S_{COM}$.

Figure 7:
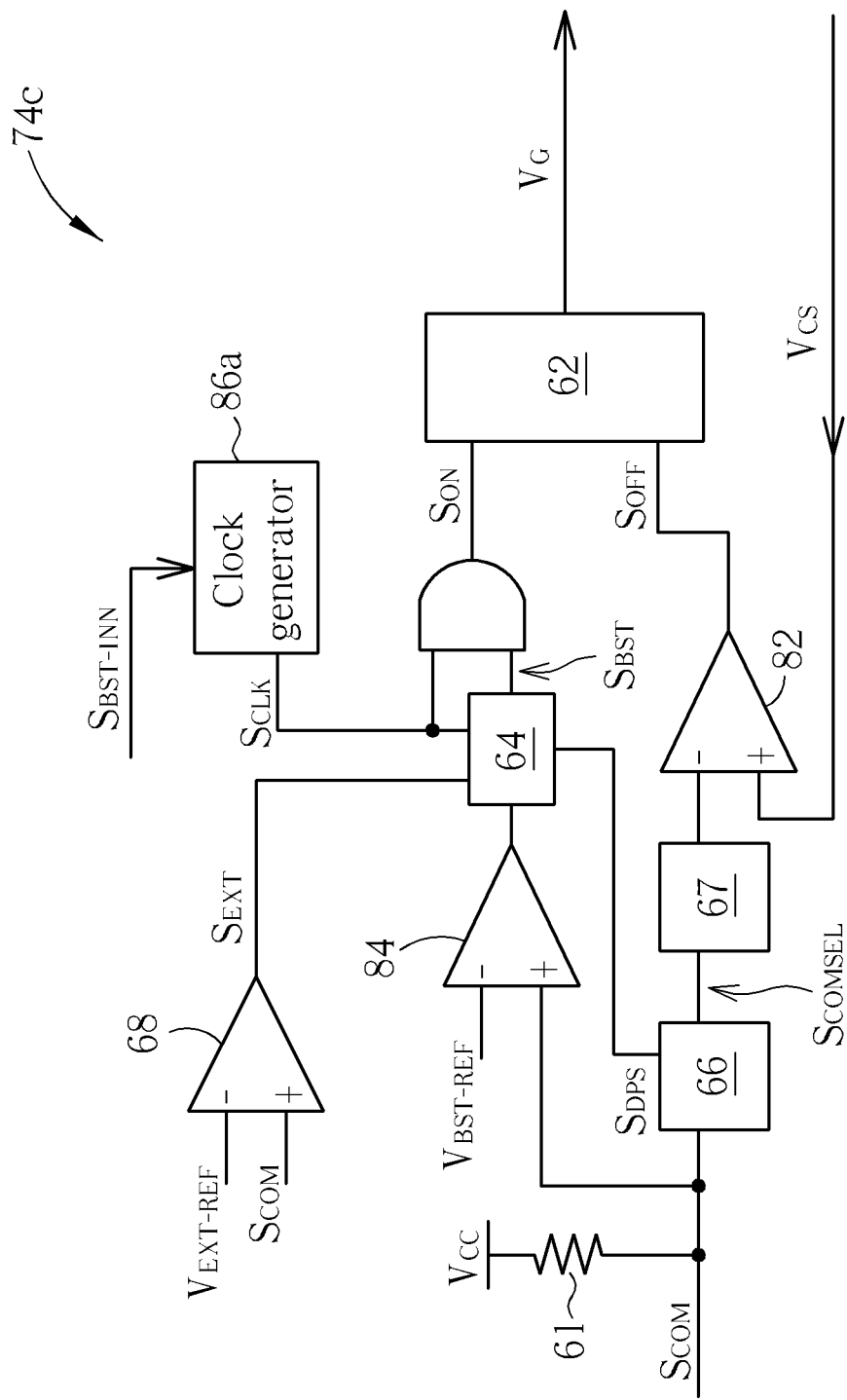
FIG. 7 illustrates a power management controller according to one embodiment of the present invention.
Figure 8:
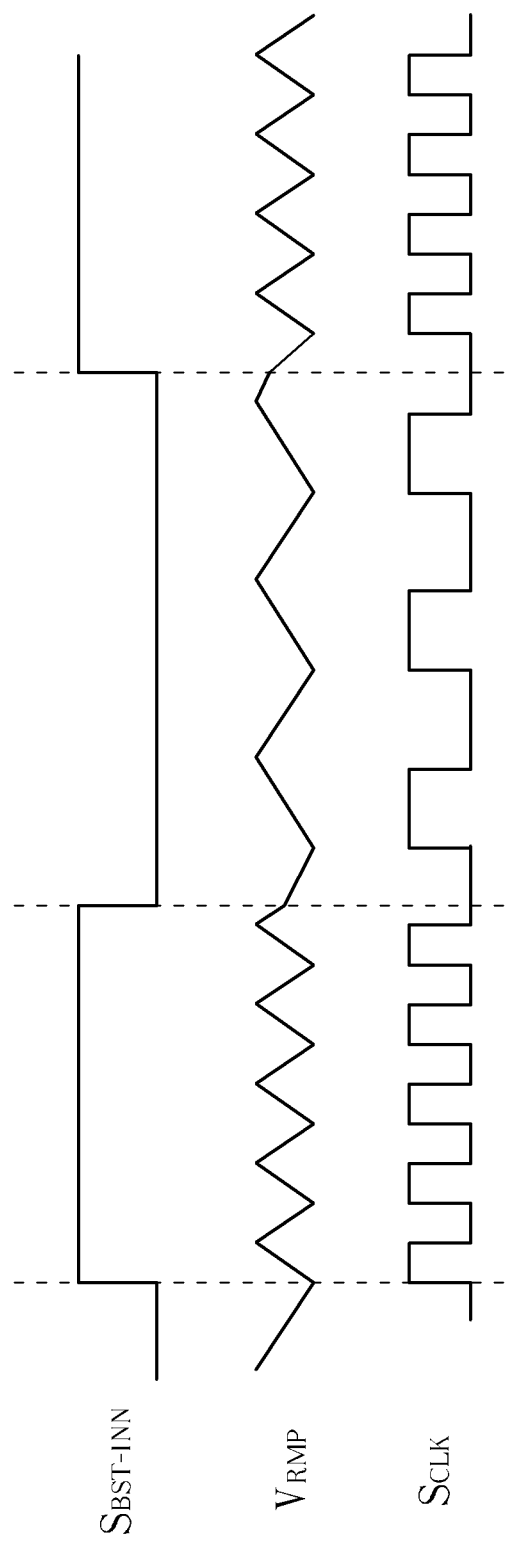
FIG. 8 illustrates waveforms of the clock generator shown in FIG. 7.

FIG. 7 illustrates power management controller 74c according to one embodiment of the present invention, where power management controller 74c may also be utilized in power supply 60 shown in FIG. 1. In comparison with FIG. 4, clock generator 86a shown in FIG. 7 further receives burst initialization signal $S_{BST-INN}$. The frequency of clock signal $S_{CLK}$ generated by clock generator 86a is changed or controlled by burst-initialization signal $S_{BST-INN}$. FIG. 8 illustrates waveforms of signals of clock generator 86a shown in FIG. 7. As shown in FIG. 8, the normal frequency of clock signal $S_{CLK}$ is higher when burst initialization signal $S_{BST-INN}$ is asserted, in comparison with the decelerated frequency of clock signal $S_{CLK}$ when burst initialization signal $S_{BST-INN}$ is disasserted. The control of the frequency of clock signal $S_{CLK}$ can be accomplished by changing a slope of triangular wave signal $V_{RMP}$, as shown in FIG. 8. In another embodiment of the present invention, the frequency of clock signal $S_{CLK}$ generated by clock generator 86a can be changed in correspondence with the transition of burst signal $S_{BST}$. The above-mentioned design may introduce advantages as follows:

(1) Reduced power consumption: In the non-switching state, a slower clock may reduce power consumption;

(2) Reduced audio noise: In the burst mode, since the group frequency of group reference signal $S_{SCLK}$ may not be constant and be dependent on the disassertion moments of burst initialization signal $S_{BST-INN}$ or burst signal $S_{BST}$, the group frequency may jitter so that audio frequency energy may be dispersed over the frequency spectrum.

Figure 9:
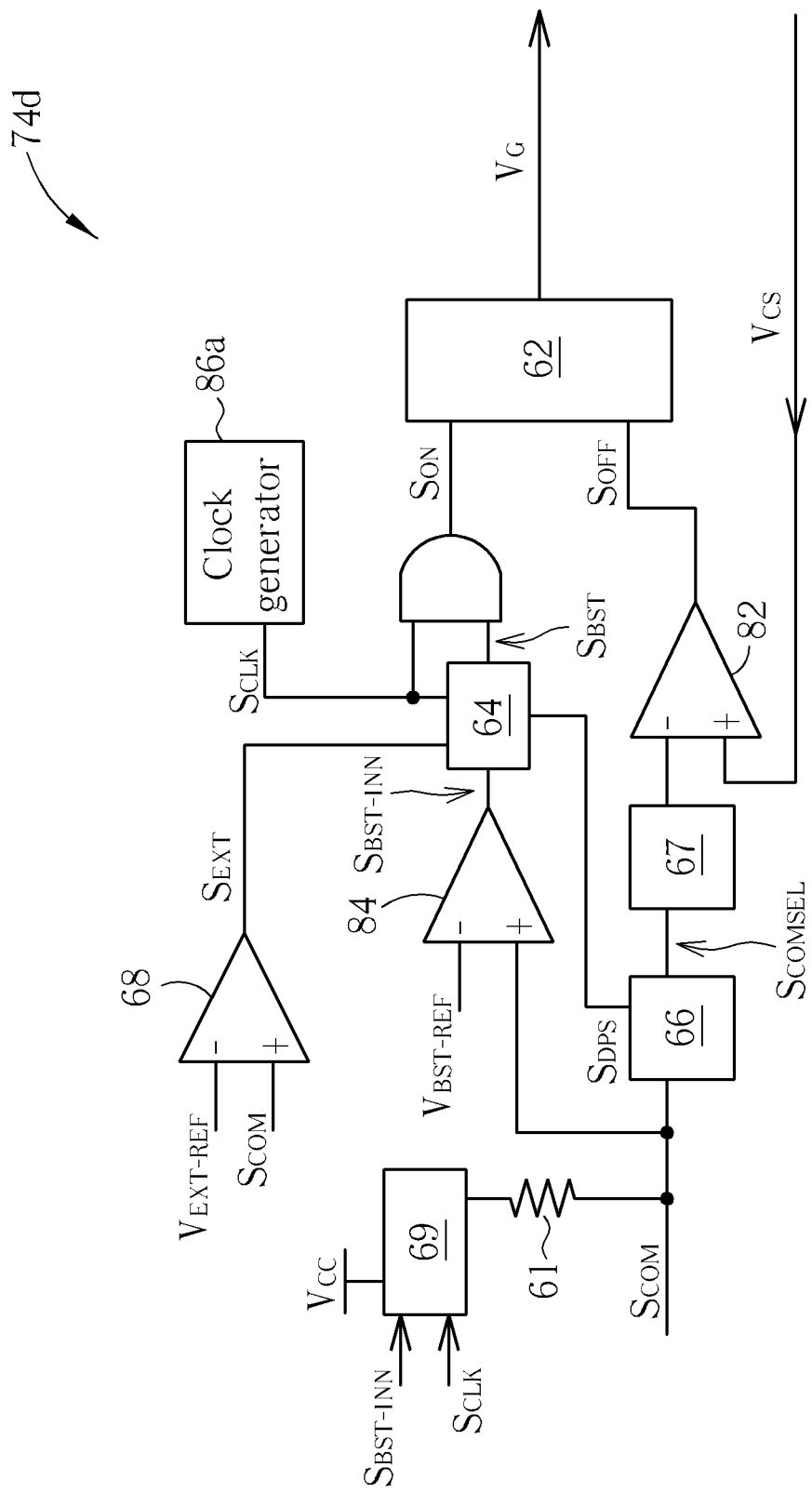
FIG. 9 illustrates a power management controller according to one embodiment of the present invention.
Figure 10:
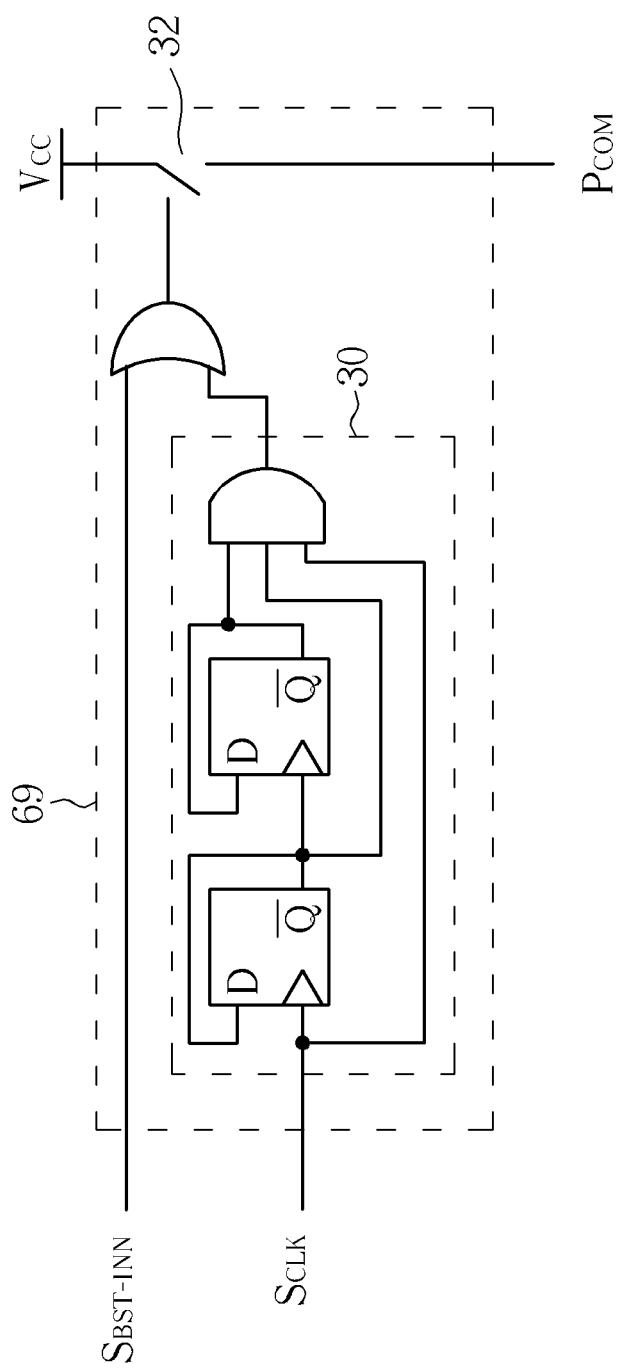
FIG. 10 illustrates a compensation loop controller shown in FIG. 9.

FIG. 9 illustrates power management controller 74d according to one embodiment of the present invention, where power management controller 74d may be utilized in power supply 60 shown in FIG. 1. Different with FIG. 4, FIG. 9 has an additional compensation loop controller 69 between resistor 61 and voltage source $V_{CC}$. FIG. 10 illustrates compensation loop controller 69 shown in FIG. 9. When burst initialization signal $S_{BST-INN}$ is asserted, switch 32 is short-circuited, and a power path is thereby formed to provide power $V_{CC}$ to build up compensation signal $S_{COM}$. When burst initialization signal $S_{BST-INN}$ is disasserted so that power supply 60 enters the non-switching state, divider 30 causes switch 32 to be short-circuited once every four switch periods of clock signal $S_{CLK}$. Switch 32 is caused to be open-circuited in the other three switch periods. Therefore, more power consumption is saved in the non-switching state.

Figure 11:
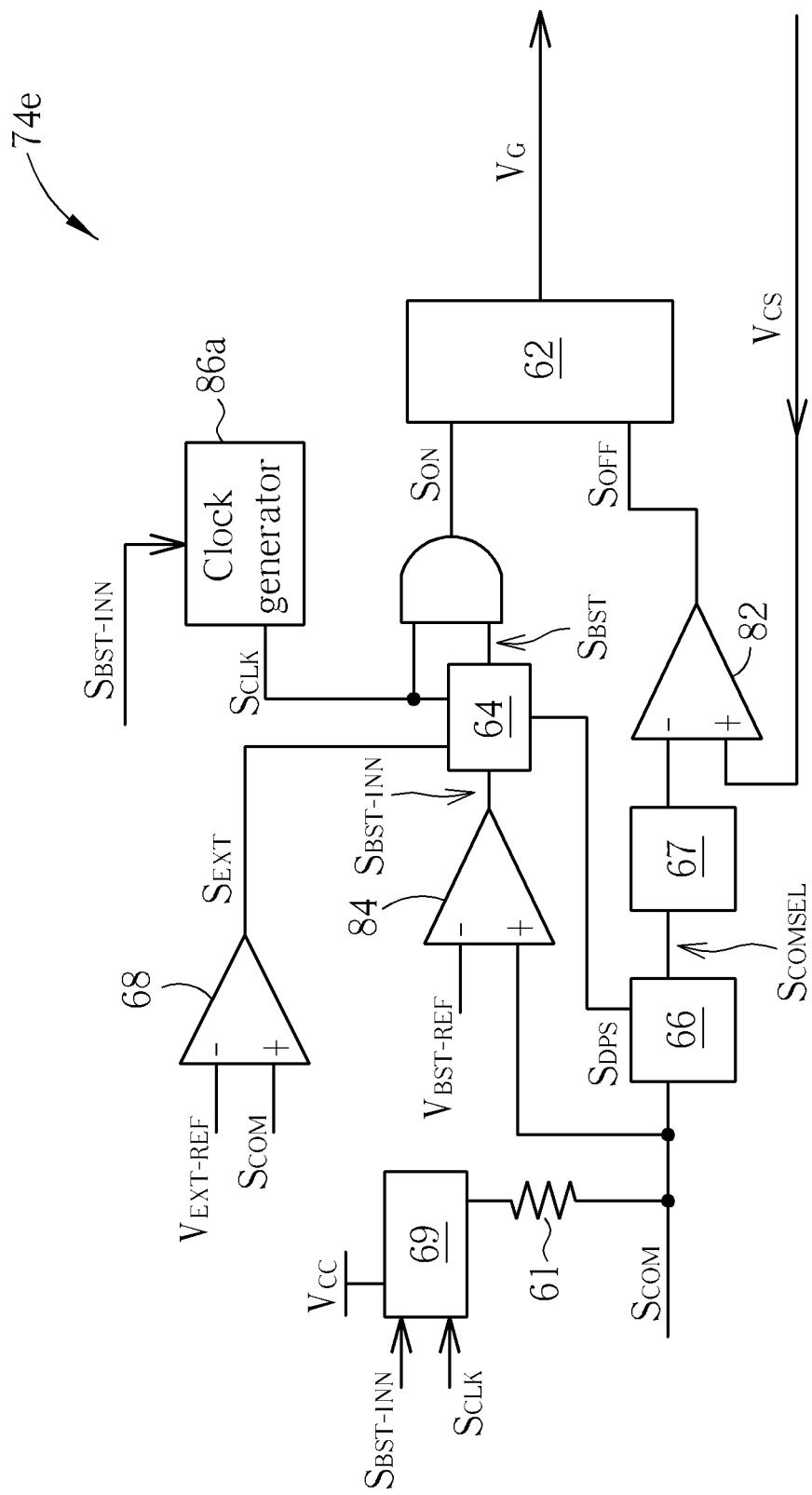
FIGS. 11 and 12 illustrate two power management controllers according to embodiments of the present invention.

FIG. 11 illustrates power management controller 74e according to one embodiment of the present invention. Power management controller 74e integrates circuitry shown in FIG. 4, FIG. 7 and FIG. 9. Operations of power management controller 74e may be derived from circuitry and teachings related to FIG. 4, FIG. 7 and FIG. 9 and are not described again here.

Figure 12:
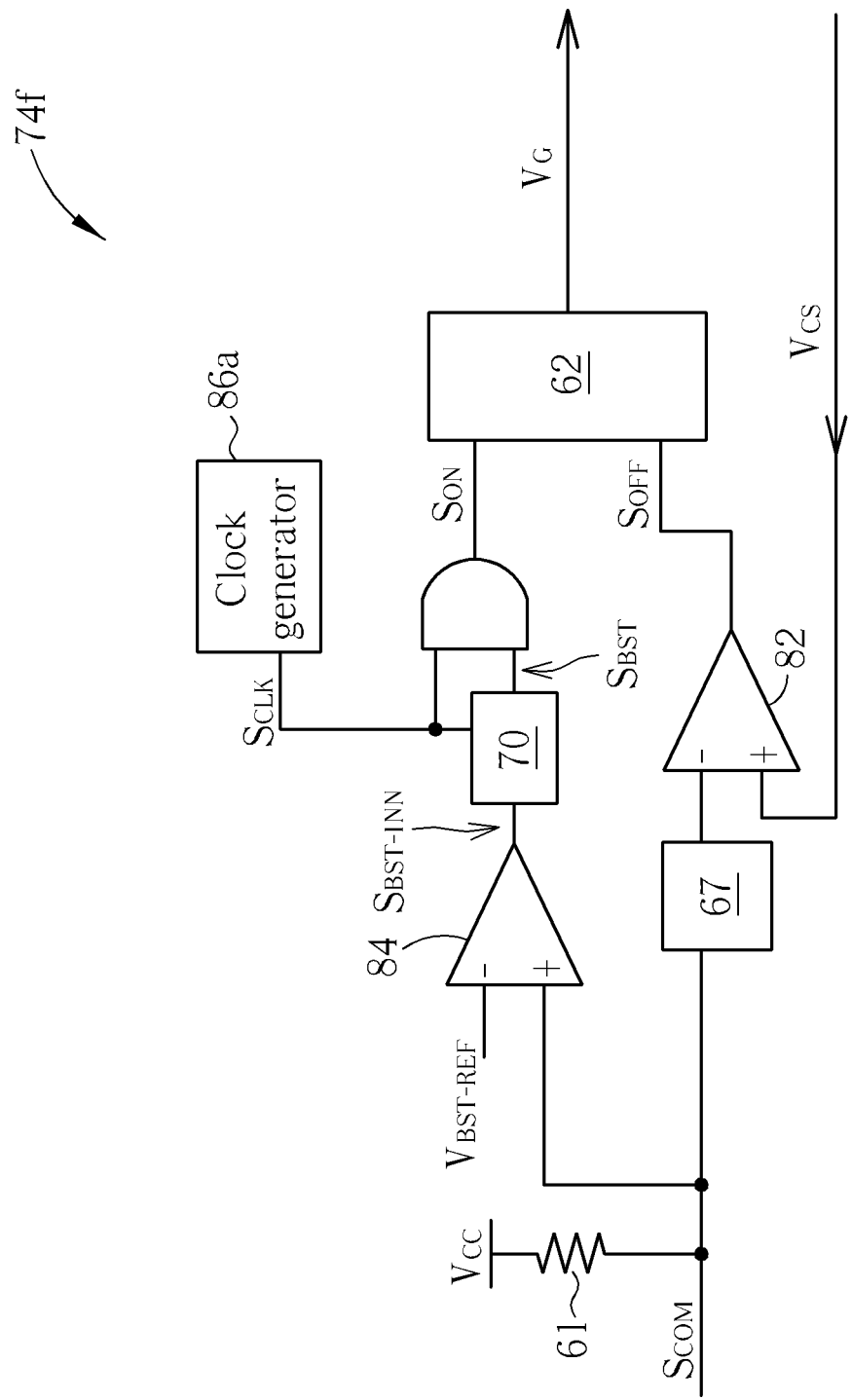
Figure 13:
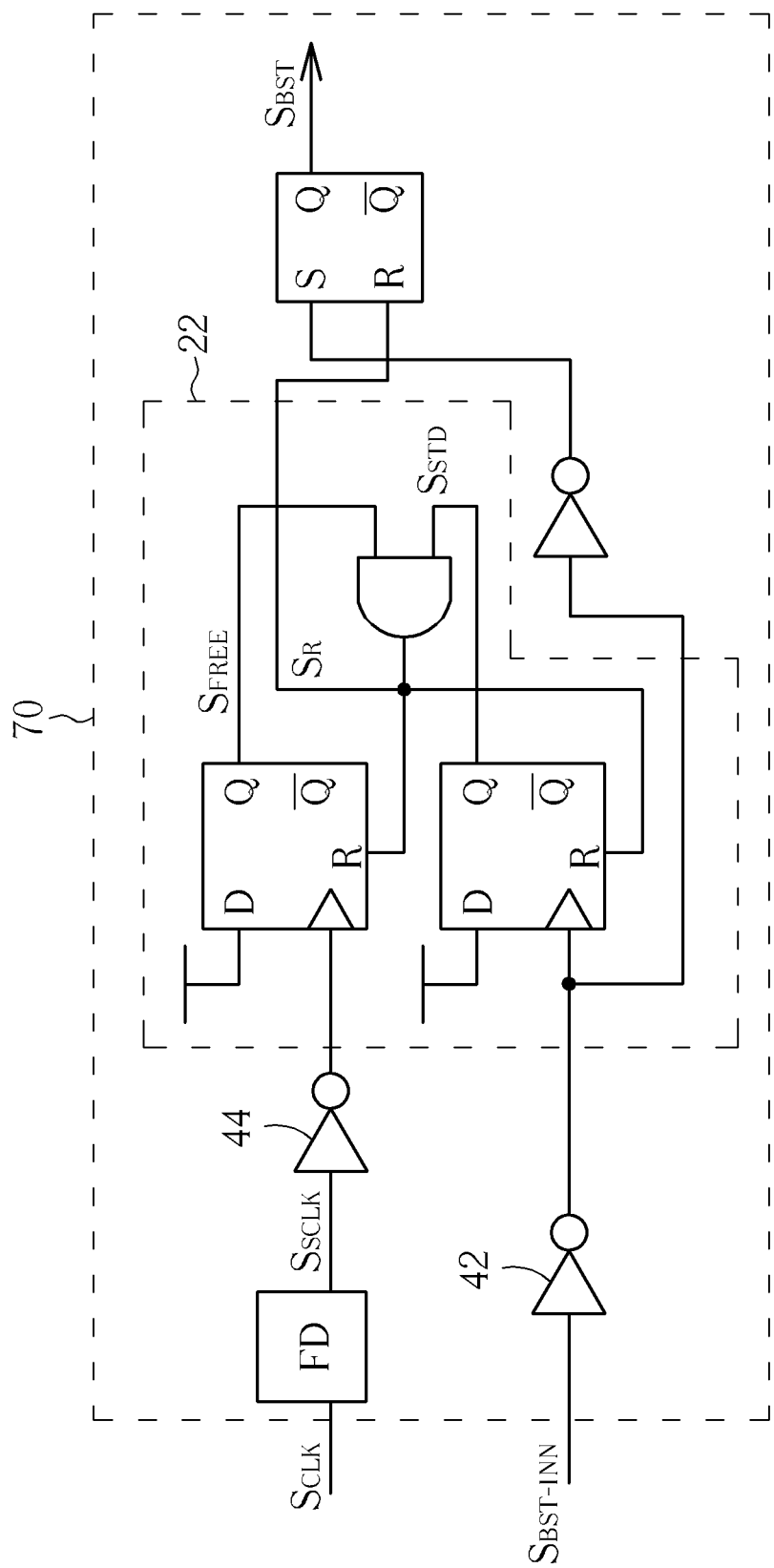
FIG. 13 illustrates the phase controller shown in FIG. 12.

FIG. 12 illustrates power management controller 74f according to one embodiment of the present invention, where power management controller 74e can be utilized in power supply 60 shown in FIG. 1. FIG. 13 illustrates phase controller 70 shown in FIG. 12 in detail. Phase controllers 74 shown in FIG. 4, FIG. 7, FIG. 9 and FIG. 11 compare the rising edges of group reference signal $S_{SCLK}$ and burst initialization signal $S_{BST-INV}$. On the contrary, phase controller 70 shown in FIG. 13 includes inverters 42 and 44 and compares falling edges of group reference signal $S_{SCLK}$ and burst initialization signal $S_{BST-INV}$. Phase controller 70 causes group frequencies corresponding to group periods between two consecutive down edges of burst signal $S_{BST}$ to not be higher than the frequency of group reference signal $S_{SCLK}$.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A power control circuit for a power supply, comprising:
a clock generator for providing a clock signal;
a phase controller for detecting a phase of a group reference signal and a phase of a burst initialization signal to generate a burst signal, so as to cause a phase of the burst signal to occur no earlier than the phase of the group reference signal, wherein the burst signal is capable of switching the power supply between a switching state and a non-switching state; and
a power stabilizer for substantially keeping an outputted power of the power supply constant after the power supply is switched from the non-switching state to the switching state;
wherein the group reference signal is generated according to the clock signal and has a frequency lower than a frequency of the clock signal; and
wherein the burst initialization signal is controlled by an output voltage of the power supply.

2. The power control circuit of claim 1 wherein the burst initialization signal is generated according to a compensation signal which is controlled by the output voltage of the power supply.

3. The power control circuit of claim 1 further comprising:
an exit comparator for detecting the compensation signal and for asserting an exit signal when the compensation signal exceeds a predetermined value, wherein the exit signal is capable of forcing the power supply to enter the switching state and is capable of causing the outputted power of the power supply to vary in correspondence with the compensation signal.

4. A power control circuit for a power supply, comprising:
a clock generator for providing a clock signal;
a phase controller for detecting a phase of a group reference signal and a phase of a burst initialization signal to generate a burst signal, so as to cause a phase of the burst signal to occur no earlier than the phase of the group reference signal, wherein the burst signal is capable of switching the power supply between a switching state and a non-switching state; and a compensation loop controller for periodically connecting or disconnecting a power path when the power supply stays in the non-switching state, wherein the power path provides power to build up a compensation signal;
wherein the group reference signal is generated according to the clock signal and has a frequency lower than a frequency of the clock signal; and
wherein the burst initialization signal is controlled by an output voltage of the power supply.

5. A power control circuit for a power supply, comprising:
a clock generator for providing a clock signal; and
a phase controller for detecting a phase of a group reference signal and a phase of a burst initialization signal to generate a burst signal, so as to cause a phase of the burst signal to occur no earlier than the phase of the group reference signal, wherein the burst signal is capable of switching the power supply between a switching state and a non-switching state;
wherein the group reference signal is generated according to the clock signal and has a frequency lower than a frequency of the clock signal; and
wherein the burst initialization signal is controlled by an output voltage of the power supply;
wherein the clock signal has a normal frequency when the power supply stays in the switching state, and the clock signal has a decelerated frequency lower than the normal frequency when the power supply stays in the non-switching state.

6. A power controlling method for a power supply, comprising:
providing a clock signal;
generating a group reference signal according to the clock signal, wherein a frequency of the group reference signal is lower than a frequency of the clock signal;
providing a compensation signal which is controlled by an output voltage of the power supply;
generating a burst initialization signal according to the compensation signal;
detecting a phase of the group reference signal and a phase of the burst initialization signal;
generating a burst signal according to the group reference signal and the burst initialization signal, and causing the phase of the burst signal to be no earlier than the phase of the group reference signal;
switching the power supply between a non-switching state and a switching state according to the burst signal; and
keeping the power supply outputting a constant power for several clock periods in correspondence with the clock signal after the power supply is switched from the non-switching state to the switching state.

7. The power controlling method of claim 6 further comprising:
forcing the power supply to enter the switching state and causing power outputted by the power supply to vary in correspondence with the compensation signal when the compensation signal exceeds a predetermined value.

8. The power controlling method of claim 6 further comprising:
reducing the frequency of the clock signal when the power supply is switched to the non-switching state.

9. The power controlling method of claim 6 further comprising:
periodically connecting or disconnecting a power path when the power supply stays in the non-switching state, wherein the power path provides power to buildup the compensation signal.

* * * * *

UNITED STATES PATENT AND TRADEMARK OFFICE
CERTIFICATE OF CORRECTION

| | |
|---|---|
| PATENT NO. | : 9,190,912 B2 |
| APPLICATION NO. | : 13/330652 |
| DATED | : November 17, 2015 |
| INVENTOR(S) | : Wen-Chung Yeh |

Page 1 of 1

It is certified that error appears in the above-identified patent and that said Letters Patent is hereby corrected as shown below:

On the Title Page, Item (54) and in the Specification, at Column 1, line 1-5, correct the title of invention from "POWER CONTROL CIRCUIT DETECTING A PHASE OF A BURST INITIALIZATION SIGNAL AND POWER CONTROLLING METHOD DETECTING A PHASE OF A BURST INITIALIZATION SIGNAL" to --POWER CONTROL CIRCUIT and METHOD DETECTING A PHASE OF A BURST INITIALIZATION SIGNAL--.

On the Title Page, Item (30), correct the Foreign Priority application number from "TW 99126242" to --TW 99146242--.

Signed and Sealed this
Twenty-ninth Day of March, 2016

Michelle K. Lee
*Director of the United States Patent and Trademark Office*